INVENTOR
GEORGE B. CROFTS
BY John J. Rogan
ATTORNEY

Jan. 20, 1959 G. B. CROFTS 2,870,334

PLURAL SECTION MAGNETICALLY VARIABLE INDUCTOR WITH FREQUENCY TRACKED SYSTEMS

Original Filed Jan. 13, 1956 2 Sheets-Sheet 2

INVENTOR
GEORGE B. CROFTS
BY John J. Rogan
ATTORNEY

1

2,870,334

PLURAL SECTION MAGNETICALLY VARIABLE INDUCTOR WITH FREQUENCY TRACKED SYSTEMS

George B. Crofts, La Verne, Calif.

Original application January 13, 1956, Serial No. 558,978, now Patent No. 2,786,940, dated March 26, 1957. Divided and this application December 6, 1956, Serial No. 626,654

5 Claims. (Cl. 250—40)

This invention relates to inductance systems and more especially it relates to systems wherein the inductance of a control device is electromagnetically varied by electric signals.

Many proposals have been made heretofore to utilize the magnetic saturation of a magnetizable core to control the frequency or impedance of an associated circuit. While such proposals have found utility to certain limited extents, they have not been found practicable where a plurality of associated devices or circuits are to be controlled, either because of the cost of the reactor devices required, or because of the difficulty of magetically segregating the several reactor units from each other so that undesirable interaction does not occur.

Accordingly, it is one of the principal objects of this invention to provide a novel system for controlling the impedance or the frequency of a plurality of separate circuits or devices, by employing a single magnetic system having a plurality of discrete saturatable magnetic elements which cooperate with the single magnetic system, but which saturatable elements can be individually controlled by respective signals without undesirable mutual interaction.

Another object is to provide a variable inductance system employing means for setting up a magnetizing field, and an electromagnetic signal-energized device having signal-controlled magnetizing windings which are substantially completely enclosed within respective saturatable magnetic housings, which can be located in said field, whereby the inductance of said windings can be simultaneously varied while completely isolating the magnetic fields of said windings from interaction with each other and with other devices external thereto.

Another object is to provide an improved signal-controlled saturatable reactor magnetic transducing system.

A further object is to provide a simple, efficient and reliable system for controlling the impedance or tuning of a plurality of separate circuits which are required to be magnetically isolated from each other, such for example as the successive tuned stages of a plural-stage radio frequency amplifier, or the radio frequency amplifier or oscillator stages of a superheterodyne radio receiver and the like.

A feature of the invention relates to a signal-controlled variable inductance system employing a magnetic circuit in the form of a solenoid winding, in conjunction with a plurality of discrete saturatable reactors, each comprising its own winding and enclosing magnetic core-housing; all the reactors being located in magnetizable permeability-controllable relation with said magnetizing circuit, but without undesirable mutual coupling between said windings.

A further feature relates to an improved remotely controlled tuning system such for example as the tuning stages of a radio receiver, whereby the tuning and frequency tracking of the various elements can be effected entirely over electric conductors and without requiring any moving elements such as movable condensers, servomotors and the like.

2

A still further feature relates to the novel organization, arrangement, and relative location and inter-connection of parts which cooperate to provide a novel signal-controlled system employing a plurality of discrete saturatable magnetic core devices.

Other features and advantages not specifically enumerated will be apparent after a consideration of the following detailed descriptions and the appended claims. Accordingly, in the drawing, Fig. 1 is a sectional view of a signal-controlled plural stage magnetic system embodying features of the invention;

Figure 1:
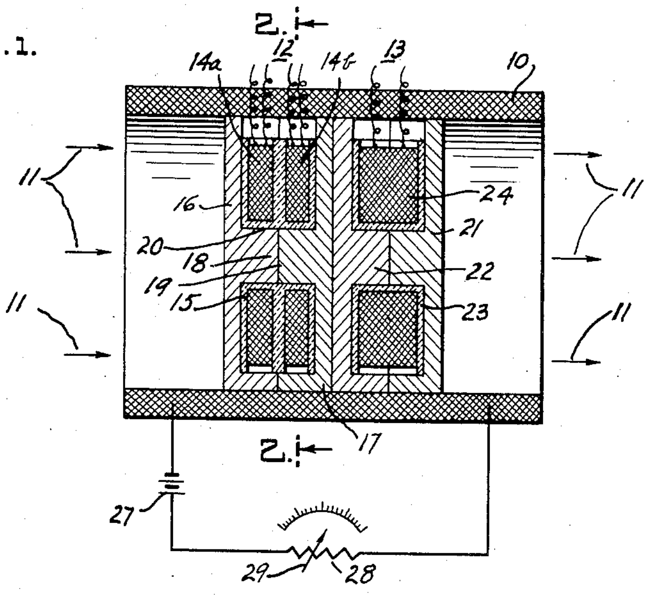
Figure 2:
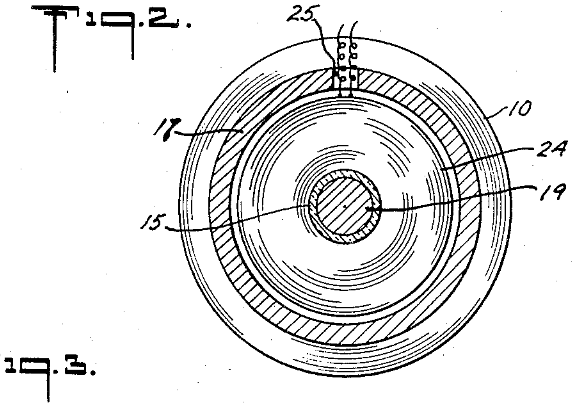
Fig. 2 is a sectional view of Fig. 1, taken along the line 2—2 thereof.

Referring to Figs. 1 and 2 of the drawing, the numeral 10 represents a solenoid or magnetizing winding for producing an adjustable steady magnetic field represented by the arrows 11. Located in serially stacked relation within the field 11 of the solenoid 10 are a plurality of similar magnetic saturatable reactor devices designated 12, 13. Each of the devices 12, 13, for example device 12, may comprise a pair of fine-wire coils 14*a*, 14*b*, which are wound on a suitable insulating form or bobbin 15. The windings 14*a*, 14*b* are completely enclosed within the two parts 16, 17 of a bi-part housing of magnetic material. That material should be of so-called high frequency iron, for example compacted powdered iron such as is conventionally used in iron core inductances for high frequency transformers and the like.

Both halves 16, 17 of the magnetic housing can be of the same construction, for example of circular shape, each having an annular groove to receive the winding bobbin 15. The dimensions of the bobbin and the dimensions of the annular grooves are such that the said bi-part sections 16, 17 can be held in close abutting relation to define the completely enclosed annular chamber in which the two windings are located, thus substantially completely magnetically shielding the windings enclosed in one pot core from the windings in an adjacent pot core. The two halves 16, 17 can be held in their abutting coaxial relation by any suitable means. However, if the center bosses 18, 19 on the two halves of the housing closely fit the bore 20 of the bobbin, such fastening means may not be required. Similarly the unit 13 comprises the two abutting pot core half sections 21, 22, each of high frequency ferro-magnetic material. In the particular example shown in Fig. 1, the winding bobbin 23 may carry only a single winding 24, which of course is completely housed and enclosed within the two abutting pot core sections 21, 22. The edges of the half sections for the two pot cores are provided with notches 25 at suitable points to permit the ends of the respective coils to be brought out for connection to respective external circuits to be controlled.

The two windings 14*a*, 14*b* being in mutual inductive relation may be used respectively as the primary and secondary windings of a tuned radio frequency transformer such for example as the antenna input transformer for the radio frequency stage of a radio receiver. Either or both windings 14*a*, 14*b* can be shunted by a respective fixed condenser to determine the tuning band of the transformer. In order to tune the transformer to any frequency within the band, the strength of the magnetic field 11 can be adjusted in any suitable manner, for example by connecting the winding of solenoid 10 to a source of direct current 27 in series with an adjustable resistor 28, the adjustable arm 29 of which can be provided with a suitable frequency calibrated scale as shown in Fig. 1.

The strength of the magnetic field represented by the arrows 11 determines the degree of magnetic saturation of the pot cores of units 12, 13 and hence it determines the permeability of those cores. With a predetermined number of turns for the windings 14*a*, 14*b*, the change in permeability of their respective pot cores will cause a corresponding simultaneous variation in the inductance of those windings and hence will vary the frequency to which both windings are tuned. The tuning band, of course, can be determined either by a fixed shunt capacitance across the windings or by their inherent capacitance. Likewise at the same time that the inductance of windings 14*a*, 14*b* is being varied, the inductance of winding 24 is also varied. Winding 24 may constitute the well known tank inductance for an electron tube oscillator, such as a Hartley oscillator, whose frequency therefore will be varied in accordance with the calibrated setting of the adjustable arm 29.

Figure 3:
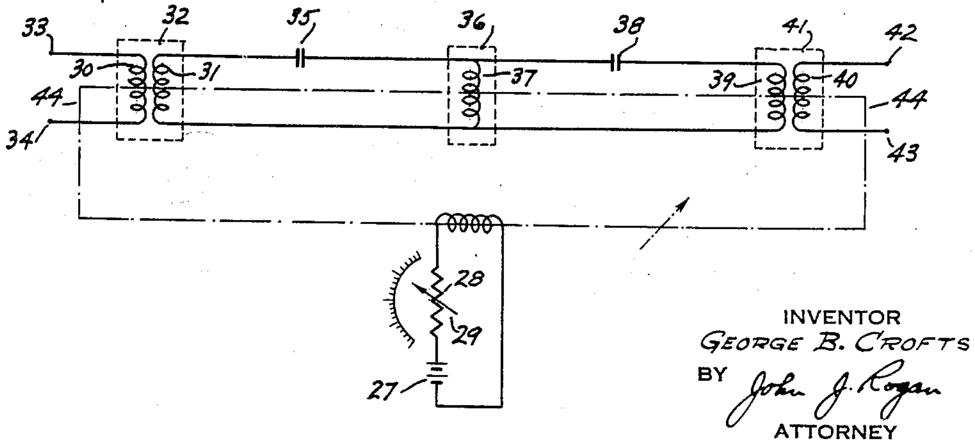
Fig. 3 shows the invention embodied in a filter.

It will be understood that the invention is not limited to the provision of only two pot cores with their respective enclosed windings for cooperation with the common magnetic circuit of coil 10, thus, if a reiterative filter is desired, then a number of such pot cores and respective completely enclosed windings may be used as shown schematically in Fig. 3 wherein the windings 30, 31 are completely enclosed within their bi-part pot core 32 similar to unit 12 of Fig. 1. The terminals of winding 30 are connected to the input terminals 33, 34 of the filter. The terminals of windings 31 can be connected for example through a fixed condenser 35 to the terminals of the single winding 37 enclosed within its pot core 36. Similarly the terminals of winding 37 can be connected through a fixed condenser 38 to one of the two windings 39, 40 which are enclosed within their respective pot cores 41. The terminals of winding 40 can be connected to output terminals 42, 43 of the filter. The common magnetic field similar to the field 11 of Fig. 1 is represented schematically in Fig. 3 by the dot-dash line 44, and the variable magnetization of this common magnetic field is represented schematically by the dot-dash arrow.

Figure 4:
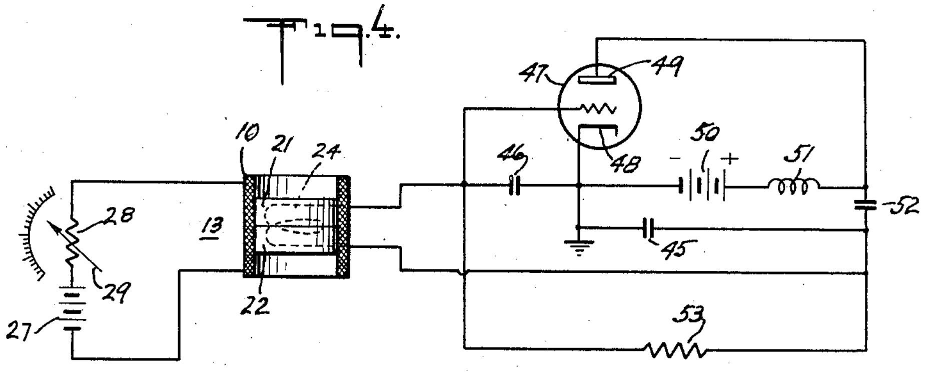
Fig. 4 shows the invention embodied in connection with a typical electron tube oscillator.

Referring to Fig. 4 there is shown an arrangement for tuning the well known Colpitts oscillator, according to the invention. The parts shown in Fig. 4 which are identical with those in Fig. 1 bear the same designation numerals. Only a single pot core unit, for example unit 13, is located in the magnetic field. The unit 13 may be connected in parallel with the series-connected tank condensers 45, 46 of a grid-controlled oscillator tube 47. The junction between the two tank condensers is connected to cathode 48. The direct current potential for the anode 49 is supplied by any well known direct current source 50 which may be connected in series with a filtering inductance 51, and also through condenser 52 to one terminal of the tank circuit and of the load circuit represented by resistor 53. The other terminal of the tank circuit and of the load circuit can be connected to the grid of tube 47. This circuit constitutes the well known Colpitts oscillator which includes the condensers 45, 46 and the inductance of unit 13 as the tank circuit. The magnetizing current of a magnitude determined by the setting of arm 29 and by the potential of source 27, flows through the winding 26 and sets up a magnetic flux through the coil 10. That magnetic flux also flows through the completely closed pot core of unit 13 which thereby becomes saturated to an extent determined by the flux density and permeability of the high frequency iron of which it is constructed. Consequently if the source 27 is a constant voltage source, the resistance 28 can be varied to control the frequency of oscillator 46 by controlling the permeability of the pot core of unit 13, which thereby controls the inductance of the winding of unit 13 constituting the tank inductance of the oscillator.

The invention is particularly advantageous when used in radio transmission systems employing a series of tuned stages for selecting any particular frequency within a predetermined reception band, while at the same time providing means for frequency tracking the stages. A typical example of such systems is the well known superheterodyne radio receiver which usually employs a tunable antenna circuit, at least one tunable stage of radio frequency amplification, and a local heterodyne oscillator whose frequency is different from the received carrier frequency but whose local oscillations must be frequency tracked with the received carrier for each reception frequency.

Figures 5, 6, 7:
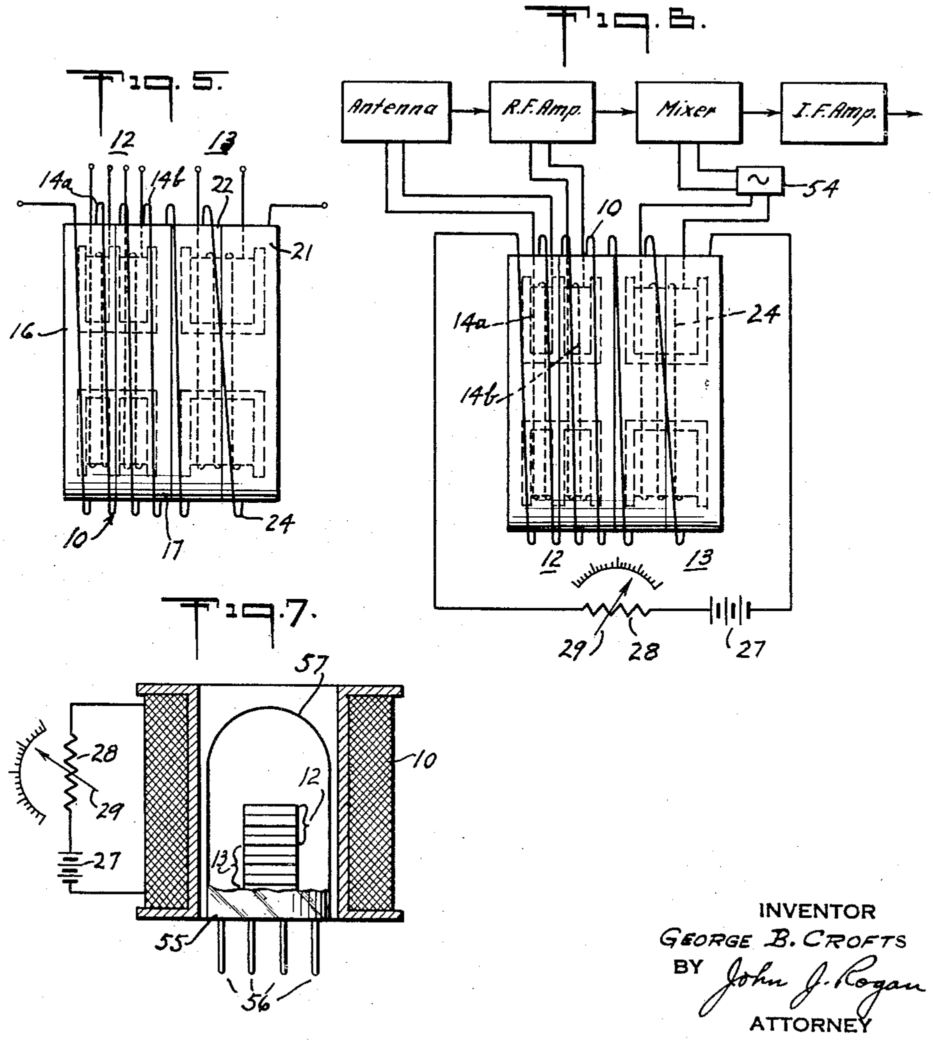
Fig. 5 is a modification of Fig. 1.
Fig. 6 shows the modification of Fig. 5 embodied in a superheterodyne radio receiver.
Fig. 7 is a further modification of Fig. 1.

Such a device is shown in Fig. 5 wherein the parts that are the same as those of Fig. 1 bear the same designation numerals. The essential difference between the embodiment of Fig. 5 and that of Fig. 1 is that the winding of solenoid 10 instead of producing a uniform magnetic field for both units 12, 13, is so designed that the number of turns surrounding the unit 12 is different from the number of turns surrounding the unit 13. Thus as shown in Fig. 5, the section of the solenoid winding around unit 12 has many times the number of magnetizing turns as compared with the number of turns around the unit 13. I have found that the arrangement of Fig. 5 not only provides a simple way of varying the frequency of the respective circuits, but it also provides a more flexible control for effecting a different frequency variation law for different pot core units in the magnetic chain.

Fig. 6 shows how the device of Fig. 5 can be embodied in a conventional superheterodyne radio receiver. Thus the unit 12 may have its two windings 14*a*, 14*b* constituting, respectively, the tuned transformer coupling between the antenna and the mixer of the superheterodyne radio receiver. The winding 24 of unit 13 may constitute the oscillator tank inductance or frequency determining element of the local oscillator 54 which also feeds the mixer. In such receivers it may be necessary to have the antenna and radio frequency coupling inductances tunable over one frequency range with a ratio for example of three to one, whereas the local oscillator may be tunable over a ratio of two to one. For that reason the portion of the solenoid winding surrounding unit 12 may have a greater number of turns as compared with the number of turns surrounding the unit 13. In other words, the turns of the solenoid surrounding unit 13 may be non-uniformly spaced axially of the solenoid to provide the desired law of frequency variation of the associated local oscillator 54. By this design of the elements it has been found possible to provide good tracking of the frequency of the local oscillator 54, of which unit 13 is the frequency determining element, and the antenna and radio frequency circuits to which the windings 14*a* and 14*b* are respectively connected.

For example in a superheterodyne radio receiver such as shown in Fig. 6, for use in the standard broadcast band, with the local oscillator 54 having a frequency above the received carrier frequency signal, the oscillator winding 24 may have an inductance range of four to one, while the antenna and radio frequency amplifier coils 14*a*, 14*b* cover a nine to one range.

The embodiment of Fig. 5 lends itself readily to a plug-in unit form of construction, in the nature of a tube such as a conventional radio tube. Thus as shown in Fig. 7 the units 12 and 13 which may be similar to the same units of Figs. 5 or 6, can be stacked and held in stacked array by any suitable means such as adhesive tape or cement. The stacked assembly can then be attached to any conventional pronged base 55 such as is usually employed in the construction of radio tubes. The various connections to the several windings of units 12 and 13 can then be made to the appropriate prongs or pins 56 carried by the base. If desired, the stacked assembly can be enclosed in a glass or non-magnetic bulb 57 which can be cemented to base 55. The magnetizing coil 10 such as shown in Fig. 5 can then be telescoped over and around the bulb 57 as shown in Fig. 7, and the magnetization of the said coil 10 can be adjusted by means of the adjustable resistance 28 and the series connected battery 27.

This application is a division of application Serial No. 558,978, filed January 13, 1956 (U. S. Patent No. 2,786,-940).

Various changes and modifications can be made in the disclosed embodiments without departing from the spirit and scope of the invention.

What is claimed is:

1. An adjustable inductance device of the kind having a plurality of saturatable core reactor units arranged to have their inductance varied simultaneously by variation of a magnetic field passing therethrough characterized in that each unit is provided with at least one high frequency winding for connection to a corresponding high frequency circuit, and with each winding substantially completely enclosed within a respective magnetic casing of high frequency iron whereby the windings of said units are substantially shielded from each other with respect to interaction between their respective electromagnetic fields, means including a single magnetizing winding surrounding all said units and of non-uniform magnetizing power to subject said units to respectively different steady magnetic field intensities and thereby to track in a predetermined relation the inductance variations of said units over a predetermined frequency band, and means to adjust said steady field intensities simultaneously so as to vary simultaneously the inductance of all said units while preserving said tracked relation.

2. An adjustable inductance device according to claim 1, in which the turns of said magnetizing winding constitute a solenoid having a different number of magnetizing turns surrounding one unit as compared with the number of magnetizing turns surrounding another unit.

3. An adjustable inductance device according to claim 1, in which the turns of said magnetizing winding are substantially uniformly spaced axially with respect to one unit but are non-uniformly spaced axially with respect to another unit.

4. An adjustable inductance device according to claim 1, in which each of said units has its winding constituting part of the tuning circuit of a corresponding high frequency signal transmission system and said magnetizing winding is connected to a source of direct current of adjustable intensity whereby all of said units are tuned simultaneously and in said tracked relation by adjustment of said current intensity.

5. An adjustable inductance device according to claim 1, in which each of said casings is in the form of a bi-part cup-like member of compacted high frequency powdered iron, said casings having substantially flat opposite faces whereby a series of such casings can be stacked in adjacent serially abutting relation while shielding their respective windings from undesirable signal coupling therebetween.

References Cited in the file of this patent

UNITED STATES PATENTS

| | | |
|---|---|---|
| 1,159,754 | Wohlfarth | May 23, 1939 |
| 2,302,893 | Roberts | Nov. 24, 1942 |
| 2,503,155 | Harvey | Apr. 4, 1950 |
| 2,581,202 | Post | Jan. 1, 1952 |

FOREIGN PATENTS

| | | |
|---|---|---|
| 896,521 | Germany | Nov. 12, 1953 |